A. W. Stephenson,
Balancing Polishing Wheels.
N°79,405. Patented June 30, 1868.
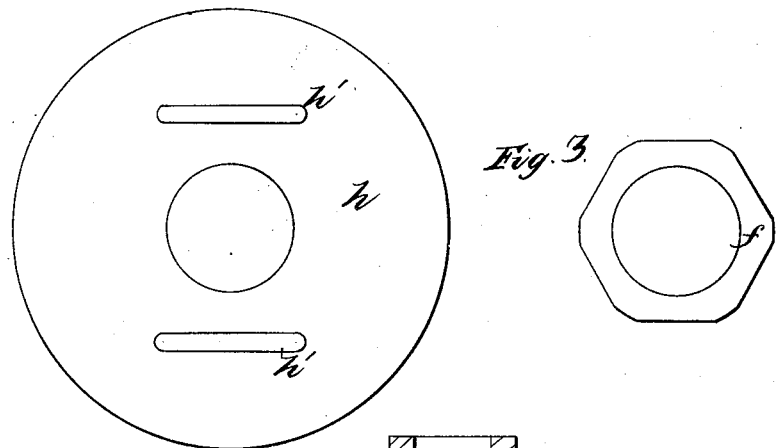
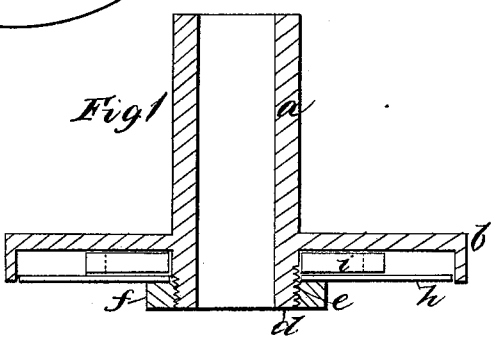
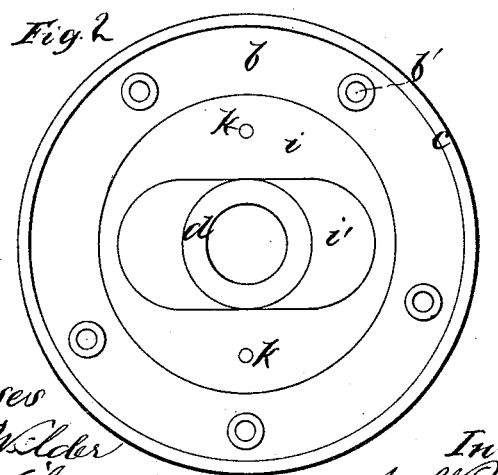
Witnesses
N. C. Wilder
J. W. Bliss
Inventor
A. W. Stephenson

United States Patent Office.

ALFRED W. STEPHENSON, OF KENSINGTON, CONNECTICUT.

Letters Patent No. 79,405, dated June 30, 1868.

IMPROVEMENT IN BALANCING POLISHING-WHEELS.

*The Schedule referred to in these Letters Patent and making part of the same.*

TO ALL WHOM IT MAY CONCERN:

Be it known that I, ALFRED W. STEPHENSON, of Kensington, county of Hartford, and State of Connecticut, have invented certain new and useful Improvements in the Mode of Balancing Polishing-Wheels; and to enable others skilled in the art to make and use the same, I will proceed to describe by referring to the drawings, in which the same letters indicate like parts in each of the figures.

The nature of this invention will be understood from the specifications and drawings.

The object desired to be obtained thereby is to avoid the common and irksome mode of balancing wheels, by boring into various points of the wheel, and inserting metal or screws, which occupies a great amount of time and patience, together with a great uncertainty as to how long they will remain balanced.

In the accompanying drawings—

Figure 1 is a sectional view of the flange, spindle-hub, adjustable balance-plate, slitted plate, and fastening-nut.

Figure 2 is a face view of the flange, with its cover or slitted plate removed.

Figure 3 is the slitted plate or fastening-nut detached from the flange.

$a$ is a spindle-hub, by which the flange and its wheels are secured to the driving-spindle.

$b$ is a flange formed on said hub.

$b'$ are screw-holes, through which screws are turned into the wheels, to secure said wheels to the hub.

$c$ is a rim, formed on the outer edge of said flange.

$d$ is the end of the hub $a$, which extends through the flange $b$ sufficient to receive the adjustable balance-plate, cover, and fastening-nut, on the outer end of which is a screw, $e$, to secure the nut $f$.

$h$ is a cap or cover, which fits closely inside the rim $c$, and over the end of the hub $d$.

This cover is provided with slits or parallel openings, $h$, each equidistant from and each side of the hub $a$.

$i$ is an adjustable balance-plate, having an elongated slit or opening, $i'$, which is placed over the hub $a$, into the depressions in the flange $b$ formed by the rim $c$. This plate is provided with regulating or adjusting-pins, $k$, which protrude through the slits or openings in the plate $h$, by means of which the pins $k$, the balancing-plate $i$, can be adjusted in such a manner as to perfectly balance the wheel in a very little time, and by the pressure of the plate on cap $h$, occasioned by the action of the nut $f$, the plate $i$ will be firmly held in a fixed position, and the wheel easily and quickly balanced whenever occasion requires.

I believe I have thus shown the nature, construction, and advantage of this invention, so as to enable others skilled in the art to make and use the same.

What I claim, therefore, and desire to secure by Letters Patent, is—

The adjustable balance-plate $i$, or its mechanical equivalent, in combination with the cap $h$ and flange-hub $b$, and nut $d$, constructed and operating substantially as and for the purpose described.

A. W. STEPHENSON. [L. S.]

Witnesses:
N. C. WILDER,
J. W. BLISS.